(12) United States Patent
Berengoltz et al.

(10) Patent No.: US 8,762,738 B2
(45) Date of Patent: Jun. 24, 2014

(54) SYSTEM AND METHOD FOR PROTECTING CONTENT ON A STORAGE DEVICE

(75) Inventors: Pavel Berengoltz, Petah-Tikva (IL); Hay Hazama, Kiryat Ono (IL)

(73) Assignee: Safend Ltd., Tel Aviv (IL)

( * ) Notice: Subject to any disclaimer, the term of this patent is extended or adjusted under 35 U.S.C. 154(b) by 200 days.

(21) Appl. No.: 13/057,143

(22) PCT Filed: Aug. 4, 2009

(86) PCT No.: PCT/IL2009/000763
§ 371 (c)(1),
(2), (4) Date: Mar. 30, 2011

(87) PCT Pub. No.: WO2010/016063
PCT Pub. Date: Feb. 11, 2010

(65) Prior Publication Data
US 2011/0185190 A1    Jul. 28, 2011

Related U.S. Application Data

(60) Provisional application No. 61/086,861, filed on Aug. 7, 2008.

(51) Int. Cl.
 *G06F 21/00* (2013.01)
 *G06F 21/62* (2013.01)
 *G06F 9/455* (2006.01)
 *H04L 29/06* (2006.01)

(52) U.S. Cl.
 CPC .. *G06F 21/6218* (2013.01); *G06F 2009/45562* (2013.01); *H04L 29/06659* (2013.01); *G06F 2212/152* (2013.01)
 USPC .......................................... 713/189; 707/827

(58) Field of Classification Search
 CPC .................. G06F 2009/45562; G06F 21/6218; G06F 2009/45587; G06F 2212/152; H04L 29/06659
 USPC ............................................ 713/189; 707/827
 See application file for complete search history.

(56) References Cited

U.S. PATENT DOCUMENTS

| | | | |
|---|---|---|---|
| 7,257,717 B2 * | 8/2007 | Huang | 713/193 |
| 7,281,104 B1 | 10/2007 | Tsypliaev et al. | |
| 8,397,046 B2 * | 3/2013 | Kudo | 711/170 |
| 2003/0204701 A1 | 10/2003 | Mimatsu et al. | |
| 2004/0068635 A1 * | 4/2004 | Bjork et al. | 711/171 |
| 2006/0182281 A1 | 8/2006 | Taguchi et al. | |
| 2006/0253549 A1 * | 11/2006 | Arakawa et al. | 709/217 |
| 2006/0282440 A1 | 12/2006 | Fletcher et al. | |
| 2007/0101083 A1 * | 5/2007 | Ogihara et al. | 711/165 |
| 2008/0098214 A1 * | 4/2008 | Rodriguez Martinez et al. | 713/156 |

OTHER PUBLICATIONS

Alexei Czeskis et al, „Defeating Encrypted and Deniable File Systems, 3rd USENIX, 2008—static.usenix.org.*

(Continued)

*Primary Examiner* — Carl Colin
*Assistant Examiner* — Ali Shayanfar
(74) *Attorney, Agent, or Firm* — Pearl Cohen Zedek Latzer Baratz LLP

(57) ABSTRACT

A system apparatus and method for protecting information on a storage device. Embodiments of the invention may create a virtual volume on a storage device. Embodiments of the invention may further transfer information to the virtual volume, remove information stored outside the virtual volume and extend the size of the virtual volume. Other embodiments are described and claimed.

8 Claims, 3 Drawing Sheets

(56) References Cited

OTHER PUBLICATIONS

International Search Report for International Application No. PCT/IL09/00763 mailed Dec. 7, 2009.

TrueCrypt, Creating new volume: http://www.truecrypt.org/docs/?s=creating-new-volume printed on Jun. 9, 2013.

Microsoft—Support, Problem: Extending a File may fail with "Disk Full" Error even though Volume has Free Space: http://support.microsoft.com/kb/957180/en-us printed on Jun. 9, 2013.

Microsoft—Developer, Sparse Files and Disk Quotas: http://msdn.microsoft.com/en-us/library/windows/desktop/aa365565%28v=vs.85%29.aspx printed on Jun. 9, 2013.

* cited by examiner

SYSTEM AND METHOD FOR PROTECTING CONTENT ON A STORAGE DEVICE

CROSS-REFERENCE TO RELATED APPLICATIONS

This application is a National Phase Application of PCT International Application No. PCT/IL2009/000763, entitled "SYSTEM AND METHOD FOR PROTECTING CONTENT ON A STORAGE DEVICE", International Filing Date Aug. 4, 2009, published on Feb. 11, 2010 as International Publication No. WO 2010/016063, which in turn claims priority from U.S. Provisional Patent Application No. 61/086,861, filed Aug. 7, 2008, both of which are incorporated herein by reference in their entirety.

BACKGROUND OF THE INVENTION

A large and increasing portion of the information handled in today's modern office environment is digital. Many organizations, institutions and establishments store, handle and manipulate most of their information, and/or information associated with their activities, in digital forms. In many cases, such information may include confidential, secret or otherwise sensitive information, which, in the wrong hands, may cause serious damage to the owner or keeper of the information and/or to those associated with the owner and/or keeper of the information.

In many cases, sensitive information may be stored on external storage devices. Modern external storage devices such as external hard disks may contain hundreds of gigabyte or even terabytes of information and may frequently be used as additional storage for mobile computers like laptops with limited internal hard disk size. External storage devices may further be used to transfer large amounts of data between cooperating companies, from manufacturer to customers and/or between branches of the same organization. Typically, sensitive information stored on such devices may be encrypted. One approach is to create a virtual volume on a partition of the storage device and encrypt information stored in such virtual volume. Some of the benefits of the virtual volume approach may be an enforcement of encryption of information upon storing, as well as upon retrieval of information. Another benefit may be alleviating the burden of installing drivers and/or utilities that may be required if/when other methods such as full disk encryption or file based encryption are used.

The problem is that if a virtual volume is to occupy all available storage space on a storage device, content already stored on the device must first be stored elsewhere. As described above, the volume already stored on such device may be too large to be readily copied to an alternative storage device and in many cases, a secondary storage device with the required storage capacity may not be available. Another problem may arise if/when the information stored on the storage device is confidential or otherwise sensitive, in such case copying, namely, duplicating such information to a secondary device may increase the security risk associated with such information. As will be shown, embodiments of the invention may solve the problems described above.

SUMMARY OF EMBODIMENTS OF THE INVENTION

Embodiments of the invention may enable protecting information on a storage device. Embodiments of the invention may create a virtual volume on the storage device and may further create a virtual replica of a directory tree or other structure according to which information is stored on the storage device. Embodiments of the invention may further copy or transfer information objects from the storage device to the virtual volume, delete the information objects copied from the storage device and extend the size of the virtual volume. According to embodiments of the invention, a process of moving information objects into the virtual volume may continue until all information objects detected on the storage device are stored in the virtual volume. According to embodiments of the invention, if/when no information or content objects are detected outside the virtual volume, the virtual volume may be extended to occupy substantially all storage capacity of the storage device.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Unless explicitly stated, the method embodiments described herein are not constrained to a particular order or sequence. Additionally, some of the described method embodiments or elements thereof can occur or be performed at the same point in time.

Figure 1:
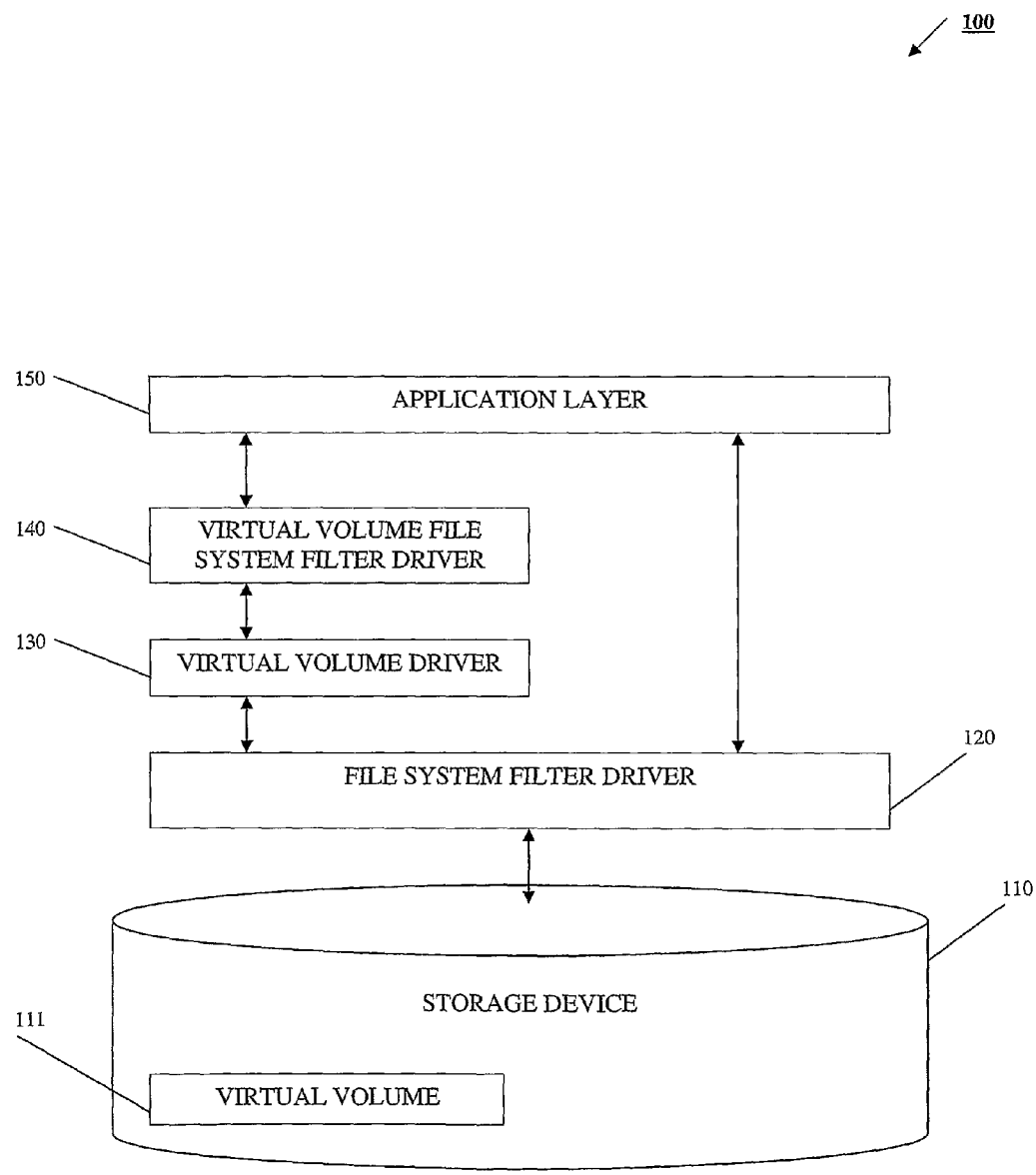
FIG. 1 shows an exemplary high level architecture that may be used to implement embodiments of the invention.

Reference is made to FIG. 1 showing exemplary components of exemplary system 100 according to embodiments of the invention. According to embodiments of the invention, system 100 may comprise storage device 110 and virtual volume 111. According to embodiments of the invention, system 100 may further comprise file system filter driver 120, virtual volume driver module 130, virtual volume file system filter driver 140 and application layer 150. Operational and/or functional aspects of components listed above are described below.

According to embodiments of the invention, storage device 110 may be an internal or external hard drive or disk, or it may be a random access memory (RAM), a dynamic random access memory (DRAM), a RAM disk, a non-volatile storage chip, a removable storage media, universal serial bus (USB) storage device, network storage device, a FLASH storage device, a backup storage system or any other suitable storage device, media or system. According to embodiments of the invention, storage device 110 may be an external storage media such as an external disk or any other external storage media, device or system.

According to embodiments of the invention, virtual volume 111 may be implemented on storage device 110. As known in the art, defining a virtual volume may comprise allocating a physical segment, e.g. a number of specific sectors, of a storage device to a virtual volume. For example, a virtual volume may be contained in a regular file in a file system managed by an operating system. According to embodiments of the invention, any suitable information repository may be used instead of a virtual volume. According to embodiments of the invention, any repository, possibly hosted by a storage system, and further enabling embodiments of the invention to store, retrieve, modify, delete or otherwise manipulate information may be used. The terms repository and virtual volume may be used interchangeably in this specification.

According to embodiments of the invention, a repository or virtual volume may further be formatted or otherwise manipulated by an application. For example, an application may format virtual volume 111 according to any, possibly proprietary and/or secret, convention, rules or logical view. Such formatting may comprise storing information in a file containing the repository or virtual volume, such information may define logical aspects pertaining to information objects stored in the repository or virtual volume. Accordingly, information stored in virtual volume 111 may be useless to any application or human unfamiliar with the convention or rules according to which virtual volume 111 is formatted. According to embodiments of the invention and as known in the art, virtual volume 111 may be presented to user mode applications as a virtual drive or a virtual partition. For example, a virtual volume created on a partition presented to user applications as "C" drive may appear to such applications as "E" drive or partition. Accordingly, an application may store information in virtual volume 111 as if it were storing information in a partition on a disk drive. According to embodiments of the invention, direct access to information, storage of information or otherwise manipulating information in a virtual volume such as virtual volume 111 may be coordinated, supervised, filtered or otherwise managed by a virtual volume file system filter driver such as virtual volume file system filter driver 140.

According to embodiments of the invention, an application whishing to access information stored in virtual volume 111 or store information in virtual volume 111 may do so by issuing a proper request to virtual volume driver 130. Accordingly, driver 130 may perform operations associated with virtual volume 111 on behalf of an application. For example, an application may format virtual volume 111 by causing driver 130 to write information to virtual volume 111. Such or other application may further read information from virtual volume 111 by having driver 130 read the information from virtual volume 111 and further provide the application with the information. Accordingly, writing information to virtual volume 111 may be done by driver 130 on behalf of an application whishing to write information to virtual volume 111.

According to embodiments of the invention, file system filter driver 120 may deny access to information stored in virtual volume 111 or deny storage of information in virtual volume 111. According to embodiments of the invention, driver 120 may monitor interactions with the file system containing virtual volume 111 and may further intercept attempts to access virtual volume 111. Such denial of access may be according to predefined rules, policies, conditions or other aspects that driver 120 may be configured to take into account upon detecting a request to read, write, delete or otherwise manipulate information in virtual volume 111 or manipulate virtual volume 111 as a whole, e.g., copy virtual volume to a storage device other than device 110. According to embodiments of the invention, file system filter driver module 120 may be configured to detect requests made to file system and may further block any operations as described above. Such configuration may force applications to only access virtual volume 111 and/or information stored in virtual volume 111 through driver 130.

According to embodiments of the invention, filter 120 may prohibit any entity other than virtual volume filter driver module 130 from accessing virtual volume 111. According to embodiments of the invention, virtual volume driver module 130 may share a secret key with file system filter module 120 and may further use such secret key in order to gain access to information stored in virtual volume 111. For example, a paradigm where by virtual volume driver module 130 may provide file system filter module 120 with a certificate may be followed. Such certificate may be pre-configured to be provided and accepted by driver module 130 and filter module 120 respectively. Accordingly, possibly after identifying driver module 130 by a known certificate, file system filter module 140 may provide driver module 130 with some secret key, parameter, code or other information. According to embodiments of the invention, file system filter module 120 may only grant access to virtual volume 111 upon being provided with the secret key or parameter. Such configuration may enable embodiments of the invention to allow access to content stored in virtual volume 111 to virtual volume driver module 130 only. Accordingly, such configuration may disable any other application or entity from manipulating content stored in virtual volume 111. It will be recognized that any other suitable way for enabling filter 120 to identify driver module 130 may be used without departing from the scope of the invention. For example, a file handle provided to driver module 130 upon an initial open of a file containing virtual volume 111 may be used as well as any other applicable information and/or parameters. According to embodiments of the invention, file system filter driver 120 may deny, block, disable or otherwise manipulate any attempt to access virtual volume 111 if the attempt is not accompanied by an appropriate parameters, e.g., a file handle as described earlier or a secret code shared by virtual volume driver 130 and file system filter driver 120.

Figure 2A:
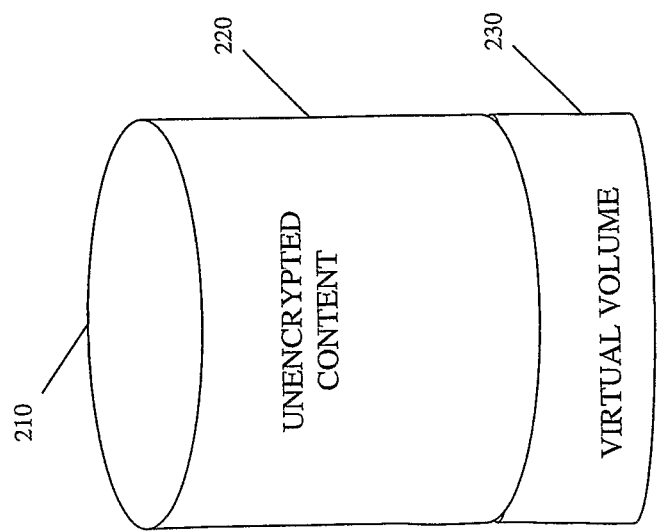
FIGS. 2A, 2B and 2C show storage capacity distributions according to embodiments of the invention.
Figure 2B:
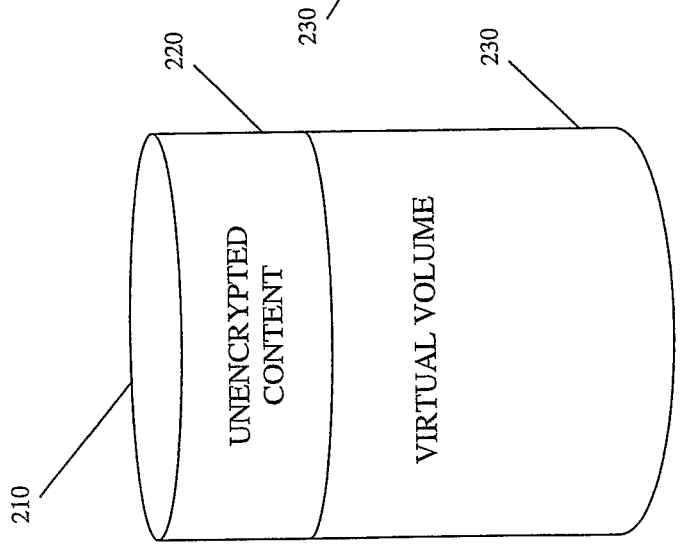
Figure 2C:
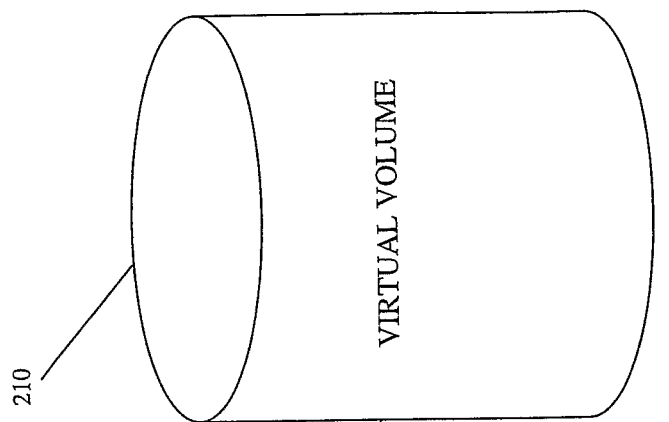

Reference is made to FIGS. 2A, 2B and 2C showing exemplary stages of storage capacity distribution according to embodiments of the invention. According to embodiments of the invention and as shown by 230 in FIG. 2A, a portion of a storage capacity of a storage device or entity may be allocated to a virtual volume. For example, storage entity 210 may be a storage device such as 110, e.g., a disk drive or a logical storage entity such as a volume or a partition on a hard disk drive. Accordingly, a portion of storage entity 210 may be allocated to or consumed by virtual volume 230. According to embodiments of the invention, virtual volume driver module 130 or another, possibly dedicated module (not shown) may scan a storage entity such as an external disk drive. According to some embodiments of the invention, in the case of a disk drive, each partition of such disk may be scanned for free, unallocated storage space.

According to embodiments of the invention, unallocated or free storage space may be allocated to a virtual volume such as virtual volume 230. Accordingly, 220 may denote storage capacity allocated for content stored on the storage device or entity at the time virtual volume 230 is created. According to embodiments of the invention, the procedure described above may be triggered or otherwise initiated by a detection of a presence of a storage device. For example, according to embodiments of the invention, driver module 130, 140, 120 or another dedicated module may be configured to detect a connection of a storage device to a computing device. For example, module 120 may detect that an external disk was connected to a computer and may further initiate the scanning and/or virtual volume creation described above. According to embodiments of the invention, a system administrator may configure a computer to perform the procedures described above upon detecting a storage device being connected to a computer. For example, an operating system may be configured to invoke modules such as drivers 120, 130 and/or 140 upon detecting that a storage device has been operatively or otherwise connected to a computing device. Upon invocation, one of filter drivers 120, 130 and/or 140 may perform a scanning of the storage device and/or a creation of a virtual volume as described. For example, a policy such as "enforce removable storage encryption" may be set for a specific computing device. Such policy may cause the computing device to perform the procedure described above upon detecting a removable or other storage device being operatively connected to the computing device. According to embodiments of the invention, the procedure described above may be repeated for each applicable storage device or entity. For example, the procedure may be repeated for each partition on an internal or external disk connected to a computer. According to embodiments of the invention, the procedure described above may be triggered as described above or it may be invoked periodically or it may be initiated by a user.

According to embodiments of the invention, possibly after a virtual volume has been created as described, virtual volume driver 120 may scan the storage device and detect content or information, other than the virtual volume, stored thereon. For example, module 120 may detect any file stored on a partition on an external disk. According to embodiments of the invention, module 120 may replicate, duplicate or reproduce the storage structure detected on the storage device. Such structure may be a catalogue of files, content or information objects stored on storage device 110 or it may be a guide, index, listing, reference, table or any other applicable structure. For example, as known in the art, a directory tree may be implemented on storage device 110. According to embodiments of the invention, volume driver 120 may replicate a directory tree found on the device or partition scanned. Such directory tree or other, possibly hierarchal structure may be similar or identical to the one found on the device or partition and may further contain place holders for all files and/or content objects found on the storage device, partition or other logical structure thereon.

According to embodiments of the invention, module 120 may further create or spawn a thread or cause an application to execute. Such application or thread may iterate over files or any other content objects stored on storage device or entity 210. According to embodiments of the invention, the application may encrypt each file or content object detected and may further store the encrypted file in virtual volume 230. According to embodiments of the invention, the application may further delete the original file from storage 220 after an encrypted version of the file has been stored in virtual volume 230. According to embodiments of the invention, the application, module 130 or another module may extend the size of virtual volume 230 by the size of the file that was encrypted, stored in virtual volume 230 and deleted from the unencrypted section 220.

As shown by FIG. 2B, by repeating the procedure described above, namely, an encryption of a file, storing the file in virtual volume 230 and deletion of the file from the unencrypted section 220 and extending the size of virtual volume 230 by the size of the file for multiple files, virtual volume 230 may grow in size to cover a substantial portion of the storage capacity of 210 while the storage space occupied by content outside virtual volume 230 as shown by 220 may be accordingly reduced. According to embodiments of the invention, and as shown by FIG. 2C, the process described above may continue by iterating over all files or other content objects detected in 220 until all content stored in 220, or outside virtual volume 230 is encrypted, stored in virtual volume 230 and deleted from 220, the portion of the storage device, partition or entity outside virtual volume 230. According to embodiments of the invention, when no more content outside virtual volume 230 is detected, virtual volume 230 may be extended to occupy the entire storage capacity of the relevant storage device, partition or entity (210). According to embodiments of the invention, from such point on, access to content stored on device, partition, volume or storage entity 210 may be performed through file system driver module 140 and virtual volume driver 130. According to embodiments of the invention, any method known in the art for extending a file, partition or volume size may be used in order to extend the size of virtual volume 230 as described above.

Figure 3:
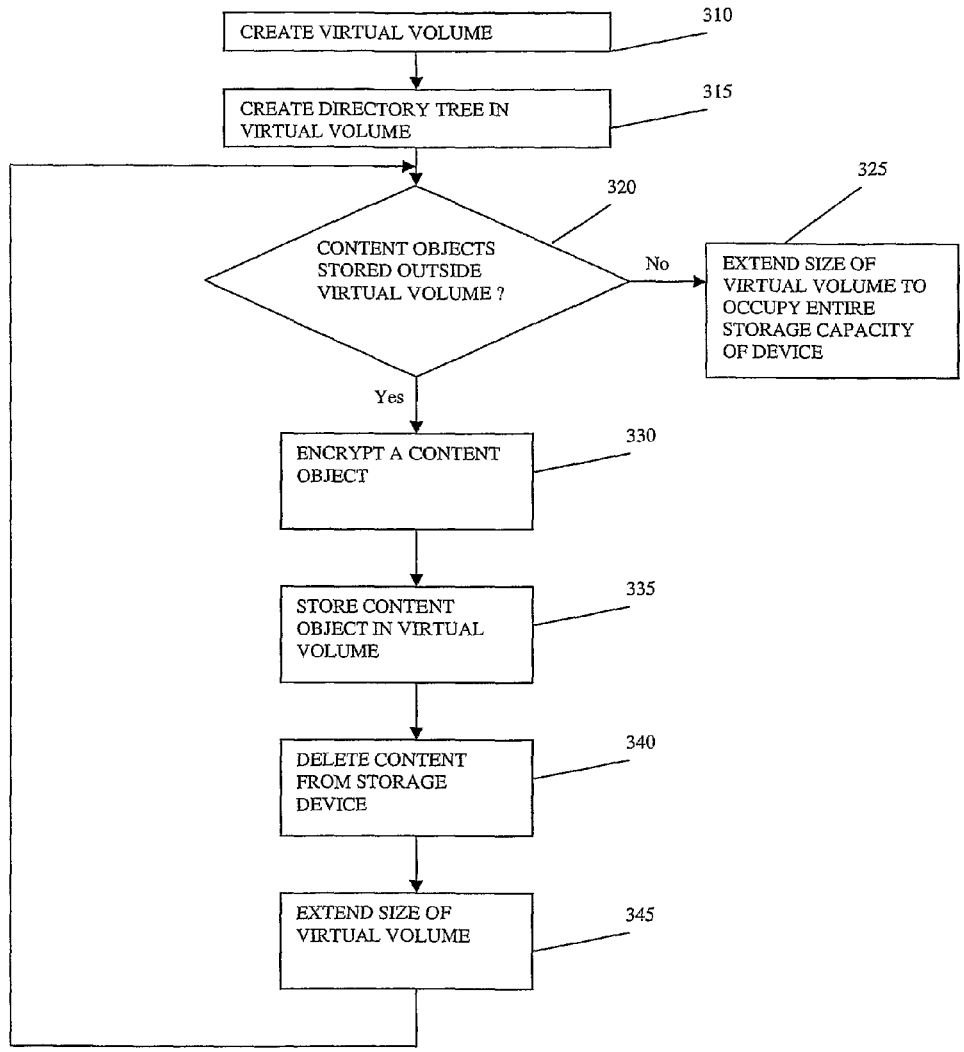
FIG. 3 shows an exemplary flowchart that may be used to implement embodiments of the invention.

Reference is made to FIG. 3 showing an exemplary flow chart that may used by embodiments of the invention to implement procedures described above. According to embodiments of the invention and as shown by block 310, the flow may include creating a virtual volume. According to embodiments of the invention, either prior to creating a virtual volume as shown by block 310 or at any stage during the flow shown in FIG. 3, access to information stored on the storage device (e.g., 110 in FIG. 1) may be blocked, disabled, restricted, or otherwise limited. For example, file system filter driver 120 may block any access to any file on a physical partition of a storage device except the virtual volume file. Alternatively or additionally, driver 120 may parse requests made by an operating system to obtain metadata about a file, or folder or free space on a physical partition. Driver 120 may further respond to such requests by indicating that a file, folder or any other applicable information object is not stored on the associated storage device, even if/when the information object is indeed stored on the storage device. For example, Windows™ may use I/O Request Packets (IRP) such as IRP_MJ_QUERY_INFORMATION, IRP_MJ_DI- RECTORY_CONTROL or IRP_MJ_QUERY_VOLUME_INFORMATION as part of accessing a file, folder or volume. Such messages sent from the operating system to a driver may be intercepted or blocked by driver 120 or responded to as described above, thus disabling access to information stored on the device. Such blocking of access to information while it is being encrypted and stored in the virtual volume may serve to maintain information coherency.

According to embodiments of the invention, instead of blocking access to information stored on the storage device outside the virtual volume as described above, an indication may be provided that the information being accessed is stored outside the virtual volume. For example, filter driver 140 may respond to such requests or access attempts by indicating that a file, folder or any other applicable information object is stored on the virtual volume, even if/when the information object is not stored in the virtual volume, or only a place holder was created. According to embodiments of the invention, filter driver 140 may further enable accessing such information by associating the placeholder in the virtual volume with the real file stored outside the virtual volume.

According to embodiments of the invention and as shown by block 315, the flow may include creating a virtual replica of the storage on a storage device. For example, a directory tree may be created in the virtual volume. According to embodiments of the invention, the directory tree created in the virtual volume as shown by block 315 may resemble or even be identical to a structure detected on the relevant storage device. As known in the art, a file system used for storing files or other content objects on a storage device, volume or partition may be organized in a hierarchal manner. Typically, a root directory is used to store files or other content objects as well as directories or folders. For example, such root or top directory or folder may be named by a letter, e.g., "C" under some operating systems, e.g., Windows™ or it may called "root" under other operating systems, e.g., Unix. According to embodiments of the invention, any structure used for storing content detected on the relevant storage entity may be duplicated within the virtual volume.

In the discussion that follows, the term "virtual file" should be expansively and broadly construed to include any digital entity used as a placeholder, pointer, reference, substitution or any other applicable virtual representation of a real, or physical file, content or information object. For example, a virtual file may be a pointer to a real or physical file. A virtual file may also be a real, physical file, possibly containing no data or information. Typically, a virtual file is associated with a real file and further shares some attributes with the associated real file. For example, a virtual file may have the same name, access permissions, modification date and time as its associated real file. Accordingly, the terms "physical file" and "real file" should be expensively and broadly construed to include any physical, storable digital entity such as a file, content or information object. For example, video clips, images and/or text documents stored on a storage device constitute real or physical files.

According to embodiments of the invention, in addition to creating a folder or directory tree as described, virtual files associated with real files stored outside the virtual volume may be created within the created directory tree. According to embodiments of the invention, such virtual files may be files containing no data, or containing arbitrary or random data. Such files may further be of any applicable size. For example, such files' size may be zero ("0") bytes or they may be created with the size of their respective files outside the virtual volume. According to embodiments of the invention, virtual files corresponding to files or content objects stored outside the virtual volume may be created, resulting in a mirror image of the storage device within the virtual volume. According to embodiments of the invention and as shown by block 320, the flow may include determining whether other than in the virtual volume, content is stored on the relevant storage entity. For example, storage device 110 may be non-empty, namely, contain or store information at a time when the flow depicted in FIG. 3 is followed or performed. According to embodiments of the invention and as shown by block 325, if other than in the virtual volume, no more files or content are detected, the virtual volume may be extended to occupy or cover the entire storage capacity of the relevant storage device, partition or entity.

According to embodiments of the invention and as shown by block 330, if content is detected outside the virtual volume, such content may be encrypted. It will be noted that according to embodiments of the invention any suitable encryption may be used without departing from the scope of the invention. For example, encryption may comprise of encoding, scrambling, reordering or otherwise relocating of bits, bytes, words, and/or sections or paragraphs comprising an information or content object, file, data object, document or any digital content. Other examples of encryption may be data obfuscation or a changing of values of various elements comprising information or content, for example according to a, possibly secret, pattern or key.

According to other embodiments of the invention, rather than or in addition to encrypting each file, files may be stored in a virtual volume either unencrypted or encrypted and the virtual volume may then be encrypted as a whole. For example, the virtual volume may be encrypted in the same way a file or any applicable information object may be encrypted, e.g., by encrypting each sector containing information associated with the virtual volume or by any other known in the art encryption methods. Encrypting the virtual volume instead or in addition to encrypting content stored in the virtual volume may serve to better protect content in the virtual volume. For example, encrypting the virtual volume itself may prevent applications and/or users from seeing which files are contained in the virtual volume and/or prevent manipulating information objects in the volume, for example, remove or replace one of the information objects from/in the virtual volume According to embodiments of the invention and as shown by block 335, encrypted content may be stored in the virtual volume created as described above. According to embodiments of the invention, the file or content object may be stored within the virtual volume according to its original location. According to embodiments of the invention and as described above, content objects may be arranged in the virtual volume according to their respective arrangement on the relevant storage device. For example, a real file stored in the virtual volume may replace its associated virtual file that may be removed at such point.

According to embodiments of the invention and as shown by block 340, after storing an encrypted version of the file or content, the file or content object may be deleted from the storage device. According to embodiments of the invention and as shown by block 345, after deleting the content from the storage device, the virtual volume may be extended by the size of the file or content object deleted as shown by block 340.

According to embodiments of the invention, a user or application may attempt to manipulate content on a storage device while a process of moving, transferring or copying content into a virtual volume is in progress. According to some embodiments of the invention, while a process of moving content into a virtual volume is in progress access to content stored on the storage device may be disabled. For example, file system filter driver 120 may block access to content on storage device 110. Driver 120 may block access attempts made by a user or any application or entity other than virtual volume driver and/or a designated module. Alternatively, driver 120 may intercept access attempts and return a response to the application or user, stating that the content object requested is not found, or that the storage device contains no files or content objects. Although such implementations may simplify the process described above, they may also be counter productive and/or cause undesirable effects.

According to other embodiments of the invention, if an attempt to access a file or content object is detected while a process of moving the file into a virtual volume is in progress, then the access attempt may be examined and an appropriate action may be taken. According to embodiments of the invention, if the access attempt involves writing or otherwise modifying the file or content then virtual volume file system filter driver 140 may suspend the request, copy the file or content object into the virtual volume and then allow the access attempt to resume, causing the access to be to the file in the virtual volume rather than to the file in the portion outside the virtual volume. If the access attempt involves no write permission, namely, the access will not modify the content of the file, then file system filter driver 140 may create a mapping between the file or place holder stored in the virtual volume and the file stored outside the virtual volume and may further enable the user or application to access the file via such mapping. The result of such mapping may enable a user to perform operations associated with the file or content stored outside the virtual volume, possibly while the file is also being encrypted and copied into the virtual volume.

According to embodiments of the invention, mapping as described above may enable a number of accessing users or applications to access a single physical file. According to embodiments of the invention, when an access attempt is made, a mapping table may be searched for a mapping between a file in the virtual volume and a corresponding file outside the virtual volume. If such mapping is found then the accessing entity may be provided with a reference, e.g., a file handle, to the file in the virtual volume and further operations associated with such reference may be routed by the mapping to the physical file.

According to some embodiments of the invention, possibly after the storage structure of the storage device is replicated within the virtual volume as described above, access to information stored in the virtual volume may be enabled even while the process of transferring information to the virtual volume is in progress. According to embodiments of the invention, a user or application may attempt to manipulate content in a virtual volume while a process of moving, transferring or copying content into a virtual volume is in progress.

According to embodiments of the invention, even though files or other content or information objects may not be physically stored in the virtual volume, they may be visible to users and/or applications, for example, by their associated virtual files. According to embodiments of the invention, an attempt to access files, possibly via their associated virtual files, in the virtual volume may be analyzed according to various criteria and access may be enabled or disabled accordingly.

According to embodiments of the invention, when a user, application, operating system or any other entity attempts to access a file or other content object in a virtual volume at least two scenarios are possible. Under the first scenario, the file or content object is already stored within the virtual volume, in such case access may be granted, providing various criteria are met, e.g., the accessing entity possesses the appropriate permissions. The accessed file may be decrypted and provided. Under a different scenario, the file or content object accessed may be stored on the storage device outside the virtual volume but not yet in the virtual volume, accordingly, the access attempt may be made via an associated virtual file. In such case the access attempt may be analyzed. If the access possibly comprises modifying the content or information accessed, for example, a write permission is requested, then the access attempt may be stalled or delayed until the real, physical content object or file is transferred into the virtual volume, at which point the access attempt may proceed as described above.

According to embodiments of the invention, if the access attempt comprises no attempt to modify of the accessed object, for example, the access is a read operation, then a reference to the accessed virtual file, e.g., a file handle associated with the virtual file in the virtual volume may be provided to the accessing entity. Such reference may further be associated with a second reference, e.g. a second file handle that may be associated with the respective real file stored on the storage device outside the virtual volume. According to embodiments of the invention, a table containing such association of file handles or other applicable references may be maintained, for example, by virtual volume driver 130 or driver 140. According to embodiments of the invention, when an access is terminated, e.g., a IRP_MJ_CLEANUP or IRP_MJ_CLOSE are received or detected, the table described above may be checked, if it is determined, for example by a number of access attempts kept in the table reaching zero ("0"), then the reference or file handle to the real file may be closed and the corresponding entry may be removed from the table. According to embodiments of the invention, the operations described above may be performed by virtual volume file system filter driver 140 shown in FIG. 1.

According to embodiments of the invention, the real file may be read from the storage device using the second reference or file handle and provided to the requesting entity using the first reference or file handle. According to embodiments of the invention, the table containing association of such reference or file handle pairs may be used to enable access to objects not physically stored in the virtual volume to any number of accessing entities. For example, a single file handle used to read the real file from a storage device may be associated with two or more file handles provided to users or applications accessing a corresponding virtual file in the virtual volume. Accordingly, when an attempt to access a virtual file in a virtual volume is detected and it is determined that the file accessed is not stored in the virtual volume, the table described above may be searched. If an entry matching the real file or virtual file being accessed is detected then a file handle already associated with the real file may be used for reading the physical file.

According to embodiments of the invention, code executing drivers, filters, programs and/or applications such as filter driver 140, driver 130 and/or filter driver 120 may be stored on the relevant storage device, e.g., storage device 110. According to embodiments of the invention, the process of transferring content into a virtual volume as described above may be interrupted, or otherwise discontinued. For example, an external disk may be disconnected from the computing device or the computing device may be shut down before the procedure described above completes. According to embodiments of the invention, such interrupted or otherwise discontinued operation may be resumed when the storage device is once again operationally connected to a computing device. For example, drivers and/or filters stored on the storage device may be executed when the device is operationally connected to a computing device and the operation may resume from the point where it was discontinued.

According to embodiments of the invention, a user may initiate such resumption of the process, or a continuation of the process may be automatic. According to embodiments of the invention, a computing device may be configured such that when an external or other storage device is connected, the computing device determines whether a process such as described above has been initiated but not completed. If so, the computing device may further load and run required software, e.g., filter driver 140, driver 130 and/or filter driver 120 and the process may continue from the point it was interrupted.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for protecting content on a storage device comprising:
   detecting, by a computing device, a connection of an external storage device to the computing device,
   creating, on the external storage device, a virtual volume having a storage capacity, wherein the external storage device contains the virtual volume;
   if a content object is detected on the external storage device outside said virtual volume, perform for each content object stored on said external storage device outside said virtual volume:
   encrypting said content object,
   copying said content object to said virtual volume, wherein encrypting said content object is performed prior to copying said content object to said virtual volume,
   deleting said content object from said external storage device outside said virtual volume, and
   extending the storage capacity of said virtual volume by the size of said content object while reducing the storage space of the external storage device outside the virtual volume by the size of the content object; and
   encrypting said virtual volume; and
   if no more content objects are detected on the external storage device, outside the virtual volume, extending the storage capacity of the virtual volume to the entire storage capacity of the external storage device.

2. The method of claim 1, further comprising
   creating a directory tree in said virtual volume, said directory tree being substantially identical to a directory tree associated with said storage device; and
   creating a plurality of virtual files in said directory tree in said virtual volume, said virtual files being associated with a respective plurality of real files actually stored on said storage device.

3. The method of claim 2, further comprising enabling access to an information object stored on said storage device by:
   detecting an attempt to access a virtual file;
   producing a reference to said virtual file;
   obtaining a reference to a real file, said real file associated with said virtual file;
   associating said reference to said real file with said reference to said virtual file; and
   using said association to enable access to said real file.

4. The method of claim 3, wherein if said reference to a real file is available prior to said detecting an attempt to access said virtual file then using said reference to a real file.

5. The method of claim 1, wherein said virtual volume is associated with a partition associated with said storage device.

6. The method of claim 1, wherein said virtual volume is associated with an external disk.

7. The method of claim 1, wherein said external storage device is a removable storage device and said creating a virtual volume is subsequent to a detection of said removable storage device being operatively connected to the computing device.

8. The method of claim 1, wherein creating said virtual volume on said storage device comprises defining a size of said virtual volume as substantially equal to the available space on said storage device.

* * * * *